(No Model.)
E. F. RAU.
BICYCLE SPROCKET WHEEL.
No. 560,929. Patented May 26, 1896.
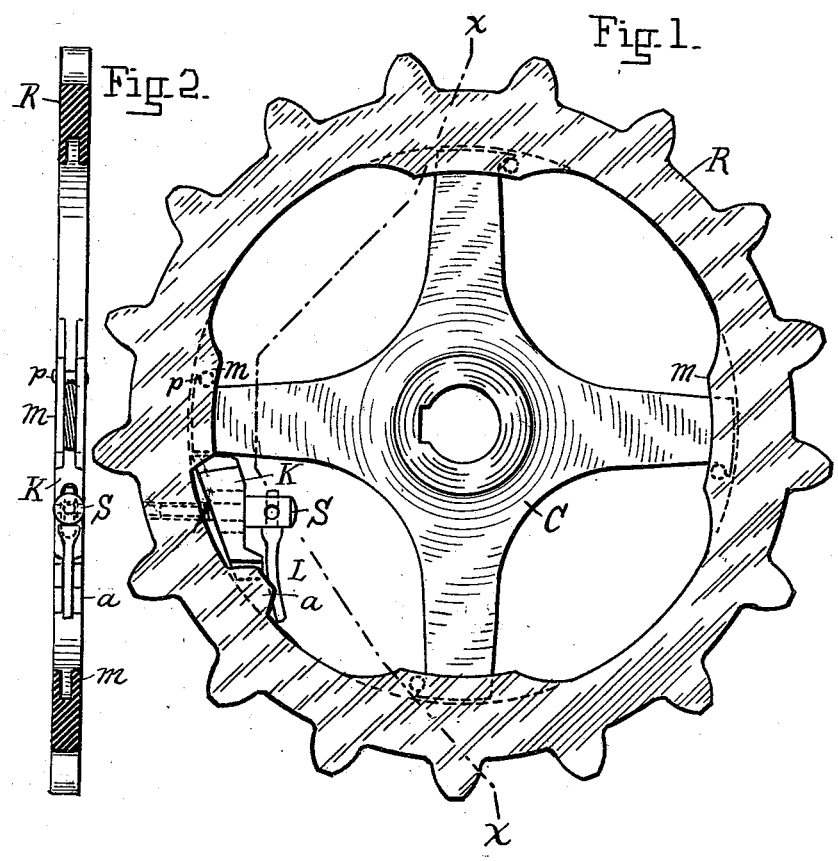
Witnesses:
G. J. Woods.
Hamilton Senior
Inventor,
Emile F. Rau,
by C. W. Balch
Attorney.

UNITED STATES PATENT OFFICE.

EMILE F. RAU, OF BROOKLYN, NEW YORK.

BICYCLE SPROCKET-WHEEL.

SPECIFICATION forming part of Letters Patent No. 560,929, dated May 26, 1896.

Application filed December 7, 1895. Serial No. 571,346. (No model.)

*To all whom it may concern:*

Be it known that I, EMILE F. RAU, a citizen of the United States of America, residing at Brooklyn, Kings county, State of New York, have invented certain new and useful Improvements in Bicycle Sprocket-Wheels, of which the following is a specification.

The purpose of my invention is to provide a sprocket-wheel for bicycles in which the rim is readily detachable without removing the hub and spokes from the crank-axle or removing the cranks. This is so that rims of different sizes exteriorly may be quickly substituted when it is desired to change the gear of the bicycle.

In the accompanying sheet of drawings, Figure 1 is a face view of my improved sprocket-wheel; and Fig. 2 is a sectional view, the section being taken along the line $xx$ of Fig. 1.

The sprocket-wheel is in two main parts—a rim R and a central portion C, consisting of the hub and spokes. Integral with the rim are interiorly-projecting parts $m$, containing mortises in which the spokes of the central portion engage. These mortises are formed by slotting the parts which project interiorly and closing one end of each slot by a pin $p$, which passes across it. The slots lie in the plane of the wheel. These interiorly-projecting parts containing mortises are equal in number with the spokes, and the spokes are separated from each other by spaces wider than the interiorly-projecting parts, so that the spokes can be brought into the plane of the wheel-rim and inserted in the mortises. An abutment $a$ also projects interiorly from the rim. This abutment is opposite the open end of one of the slots, or, in other words, is opposite the open side of the mortise which the slot makes. This abutment is also slotted. The spokes of the central portion have hooked ends which lie between the bottoms of the slots and the pins which pass across the slots.

The rim is assembled on the central portion by bringing it over the spokes and slightly rotating it, so that the spokes will simultaneously enter the open sides of the mortises. When in place, a key-piece K is inserted between the abutment $a$ and the spoke which lies in the mortise which is opposite. The key-piece is held securely in place by a screw S, which passes through a slot in it and screws into a threaded hole in the rim. The screw is turned by a lever L, which is inserted into holes in the screw-head. When the screw is tightened up, the outward end of the lever is sprung into the slot or groove through the abutment, as shown. The lever is thus retained in the screw, and the latter is kept from jarring loose.

Rims of various sizes and numbers of teeth are used with the same central portion, and in order to be thus interchangeable the interiorly-projecting parts must in each instance extend to within the same distance of the center. These parts will consequently be longer on large rims.

What I claim as new, and desire to secure by Letters Patent of the United States, is—

1. A detachable sprocket-wheel rim provided with interiorly-projecting parts containing mortises, each of which is open on one side in the plane of the wheel, in combination with a hub provided with spokes, the spokes being separated from each other by spaces wider than the interiorly-projecting parts of the wheel-rim, and means for securing the spokes mounted on the hub in the mortises, substantially as described.

2. A detachable sprocket-wheel rim provided with interiorly-projecting parts containing mortises, each of which is open on one side in the plane of the wheel, and closed on the opposite side, in combination with a hub provided with spokes, and means for securing the spokes in the mortises, substantially as described.

3. A detachable sprocket-wheel rim provided with interiorly-projecting parts slotted in the plane of the wheel, and having a pin across one end of the slot in each projecting part, and means for securing spokes mounted on a hub in the mortises, substantially as described.

4. A detachable sprocket-wheel rim provided with interiorly-projecting parts slotted in the plane of the wheel, and having a pin across one end of the slot in each projecting part, in combination with a hub provided with spokes having hooked ends, and means for securing the spokes in the mortises, substantially as described.

5. A detachable sprocket-wheel rim having an interiorly-projecting part containing a mortise which is open on one side in the plane of the wheel and an abutment opposite the open side of the mortise, in combination with a hub having a spoke fitted to the mortise, a key-piece, and means for securing the key-piece between the abutment and the mortise, substantially as described.

Signed by me, in New York city, this 5th day of December, 1895.

EMILE F. RAU.

Witnesses:
SAMUEL W. BALCH,
EDWIN S. HUNT.